US012488583B2

(12) United States Patent
Lee et al.

(10) Patent No.: US 12,488,583 B2
(45) Date of Patent: Dec. 2, 2025

(54) DEEP NEURAL NETWORK-BASED OBJECT DETECTION METHOD, AND CLOUD SERVER AND EDGE DEVICE PERFORMING DEEP NEURAL NETWORK-BASED OBJECT DETECTION METHOD

(71) Applicant: Research & Business Foundation SUNGKYUNKWAN UNIVERSITY, Suwon-si (KR)

(72) Inventors: Joo Chan Lee, Suwon-si (KR); Jong Hwan Ko, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 346 days.

(21) Appl. No.: 18/197,891

(22) Filed: May 16, 2023

(65) Prior Publication Data
US 2023/0368518 A1     Nov. 16, 2023

(30) Foreign Application Priority Data
May 16, 2022   (KR) .................. 10-2022-0059423

(51) Int. Cl.
G06V 10/94   (2022.01)
G06V 10/77   (2022.01)
G06V 10/774  (2022.01)
G06V 10/82   (2022.01)

(52) U.S. Cl.
CPC .......... *G06V 10/94* (2022.01); *G06V 10/7715* (2022.01); *G06V 10/774* (2022.01); *G06V 10/82* (2022.01)

(58) Field of Classification Search
None
See application file for complete search history.

(56) References Cited

U.S. PATENT DOCUMENTS

2024/0394928 A1*  11/2024  Gan ................... G06T 9/002

OTHER PUBLICATIONS

Request for the Submission of an Opinion for Korean Patent Application No. 10-2022-0059423, dated May 23, 2025.
Zhongzheng Yuan et al., "Feature Compression for Rate Constrained Object Detection on the Edge," 2022 IEEE 5th International Conference on Multimedia Information Processing and Retrieval (MIPR), Aug. 2022, arXiv:2204.07314v1 [eess.IV].
Zhiqiang Cao et al., "Edge-Cloud Collaborated Object Detection via Difficult-Case Discriminator," 2023 IEEE 43rd International Conference on Distributed Computing Systems (ICDCS), Jul. 2023, arXiv preprint arXiv:2108.12858.

* cited by examiner

*Primary Examiner* — Leon Flores

(57) ABSTRACT

The present disclosure relates to a deep neural network-based object detection device, system, and method, and more particularly, to a deep neural network-based object detection device, system, and method capable of rapidly detecting an object in an image in real time.

15 Claims, 7 Drawing Sheets

DEEP NEURAL NETWORK-BASED OBJECT DETECTION METHOD, AND CLOUD SERVER AND EDGE DEVICE PERFORMING DEEP NEURAL NETWORK-BASED OBJECT DETECTION METHOD

TECHNICAL FIELD

The present disclosure relates to a deep neural network-based object detection device, system, and method, and more particularly, to a deep neural network-based object detection device, system, and method capable of rapidly detecting an object in an image in real time. This work was supported by Institute of Information & communications Technology Planning & Evaluation (IITP) grant funded by Korea government (MSIT) ([Project unique No.: 1711126132; Project No.: 2019-0-00421-003; R&D project: Information Communication Broadcasting Innovative Talent Development Project; and Research Project Title: Artificial Intelligence Graduate School Program], [Project unique No.: 1711139517; Project No.: 2021-0-02068-001: R&D project: Information Communication Broadcasting Innovative Talent Development Project; and Research Project Title: Development for Artificial Intelligence Innovative Hub], and [Project unique No.: 1711139247; Project No.: 2021-0-02052-001; R&D project: Information Communication Broadcasting Innovative Talent Development Project; and Research Project Title: Development for Artificial Intelligence System on a Chip for Smart Mobility]).

BACKGROUND

With the recent development of deep neural networks (DNNs), excellent performance has been implemented in various tasks related to computer vision. However, due to resource constraints, it is still difficult for edge devices to acquire images in real time and perform real-time inference of DNN models with complex deep neural networks. In this case, images obtained by an edge device can be transmitted to a cloud server equipped with a high-performance GPU for processing. However, due to the characteristics of an edge device that needs to use a wireless network, it may take a long time to transmit images. In order to solve this problem, it is possible to use an edge-cloud split inference technique in which an edge device uses a part of a deep neural network, and features smaller than the original image are transmitted to a cloud server for processing.

In general, since the size of a feature decreases as the number of layers for extracting a feature increases, an appropriate split point needs to be present for each network.

However, unlike image classifiers, general deep neural network-based object detectors need to use multiple layers of features in order to effectively detect objects of various sizes.

That is, object detection is not performed using only the last feature of a feature-extracting layer, but predetermined intermediate features among a plurality of feature-extracting layers are also required.

For this reason, the amount of transmission increases in a split inference situation, and thus it is difficult to find an appropriate split point in a general object detector layer.

SUMMARY

In view of the above, the present disclosure provides a deep neural network-based object detection device, system, and method capable of rapidly detecting an object of an image in real time.

Objects of the present disclosure are not limited to the aforementioned object, and other objects not mentioned will be clearly understood by those skilled in the art from the description below.

The aspects of the present disclosure are not limited to the foregoing, and other aspects not mentioned herein will be clearly understood by those skilled in the art from the following description.

In accordance with an aspect of the present disclosure, there is provided a cloud server for detecting an object of an image based on a single feature received from an edge device, the cloud server may comprise: a memory configured to store information on a pre-trained extractor of the cloud server having a first layer and a second layer and a pre-trained reconstructor of the cloud server; and a processor, wherein the processor is configured to: receive a single feature of an image from the edge device, wherein the edge device includes an extractor having a plurality of layers and the single feature of the image is extracted by a first layer of the extractor of the edge device corresponding to a predetermined split point among the plurality of layers of the extractor of the edge device; and obtain an output feature of the extractor of the cloud server by inputting the single feature received from the first layer included in the extractor of the edge device to the second layer included in the extractor of the cloud server, and detect an object in the image by inputting the output feature obtained from the extractor of the cloud server to the reconstructor of the cloud server.

The extractor of the edge device or the extractor of the cloud server may be an artificial neural network trained by receiving training images and object information detected from the training images, and the extractor of the edge device or the extractor of the cloud server may be trained to output a single feature corresponding to each of the training images.

The reconstructor of the cloud server may be an artificial neural network trained by receiving training images and object information detected from the training images, and the reconstructor of the cloud server may be trained to output a plurality of features corresponding to the single feature output from the extractor of the edge device or the extractor of the cloud server.

Each layer of the reconstructor of the cloud server may have an inverse operation relationship with each layer of the extractor of the edge device or the extractor of the cloud server to reconstruct predetermined intermediate layer features of the extractor of the edge device or the extractor of the cloud server.

A number of channels of at least one of the plurality of layers included in the extractor of the edge device or the extractor of the cloud server may be less than a number of channels corresponding to at least one of a plurality of layers included in the reconstructor of the cloud server.

A number of the plurality of layers included in the extractor of the edge device or the extractor of the cloud server may be less than a number of the plurality of layers included in the reconstructor of the cloud server.

In accordance with another aspect of the present disclosure, there is provided an edge device for transmitting a single feature obtained from an image to a cloud server, the cloud server may comprise: a memory configured to store information on a pre-trained extractor of the edge device having a plurality of layers; and a processor, wherein the processor is configured to: input the image to the pre-trained extractor of the edge device, extract the single feature of the image from a first layer corresponding to a predetermined split point among the plurality of layers included in the extractor of the edge device, and transmit the extracted single feature to the cloud server.

The cloud server may include a memory configured to store information on an extractor of the cloud server including same structure as the extractor of the edge device and a reconstructor of the cloud server, and a processor. The processor of the cloud server may be configured to: receive the single feature from the edge device, input the single feature received from the extractor of the edge device to a portion of the extractor of the cloud server, obtain an output feature ouput from the extractor of the cloud server, input the output feature to the reconstructor of the cloud server, and obtain a plurality of intermediate features used to detect an object in the image ouput from the reconstructor of the cloud server.

The processor of the edge device may be configured to analyze at least one of a network resource between the edge device and the cloud server, a computing resource of the edge device, and a computing resource of the cloud server, and determine a location of the split point with respect to the first layer based on an analysis result.

The extractor of the cloud server and the reconstructor of the cloud server may include a plurality of layers, and each layer of the reconstructor of the cloud server may have an inverse operation relationship with each layer of the extractor of the edge device or the extractor of the cloud server to reconstruct predetermined intermediate layer features of the extractor of the cloud server.

The extractor of the cloud server and the reconstructor of the cloud server may include a plurality of layers, and a number of channels of at least one of the plurality of layers included in the extractor of the edge device or the extractor of the cloud server may be less than a number of channels corresponding to at least one of a plurality of layers included in the reconstructor of the cloud server.

The extractor of the cloud server and the reconstructor of the cloud server may include a plurality of layers, and a number of the plurality of layers included in the extractor of the edge device or the extractor of the cloud server may be less than a number of the plurality of layers included in the reconstructor of the cloud server.

In accordance with another aspect of the present disclosure, there is provided a deep neural network-based object detection method, the method may comprise: inputting, by a processor included in an edge device, an acquired image to a pre-trained extractor of the edge device: extracting, by the processor included in the edge device, a single feature corresponding to the image from a first layer of the extractor corresponding to a predetermined split point among a plurality of layers included in the extractor of the edge device; transmitting, by the processor included in the edge device, the extracted single feature to a cloud server: receiving, by a processor included in the cloud server, the single feature from the edge device, wherein the cloud server includes an extractor of the cloud server having a first layer and a second layer and a reconstructor: obtaining, by the processor included in the cloud server, an output feature of the extractor of the cloud server by inputting the single feature to the second layer included in the extractor of the cloud server; and obtaining, by the processor included in the cloud server, a plurality of intermediate features used to detect an object in the image by inputting the output feature to the reconstructor of the cloud server.

The method may comprise: analyzing, by the processor included in the edge device, at least one of a network resource between the edge device and the cloud server, a computing resource of the edge device, and a computing resource of the cloud server; and determining a location of the split point with respect to the first layer included in the extractor of the edge device based on an analysis result.

The extractor of the edge device or the extractor of the cloud server may be an artificial neural network trained by receiving training images and object information detected from the training images, and the extractor of the edge device or the extractor of the cloud server may be trained to output a single feature corresponding to each of the training images.

The reconstructor of the cloud server may be an artificial neural network trained by receiving training images and object information detected from the training images, and the reconstructor of the cloud server may be trained to output a plurality of features corresponding to the single feature output from the extractor of the edge device or the extractor of the cloud server.

Each layer of the reconstructor of the cloud server may have an inverse operation relationship with each layer of the extractor of the edge device or the extractor of the cloud server to reconstruct predetermined intermediate layer features of the extractor of the edge device or the extractor of the cloud server.

A number of channels of at least one of the plurality of layers included in the extractor of the edge device or the extractor of the cloud server may be less than a number of channels corresponding to at least one of a plurality of layers included in the reconstructor of the cloud server.

A number of the plurality of layers included in the extractor of the edge device or the extractor of the cloud server may be less than a number of the plurality of layers included in the reconstructor of the cloud server.

According to the deep neural network-based object detection device, system, and method according to an embodiment of the present disclosure, an object in an image can be rapidly detected in real time.

The effects of the present disclosure are not limited to the aforementioned effect, and other effects not mentioned will be clearly understood by those skilled in the art from the description below.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 1:
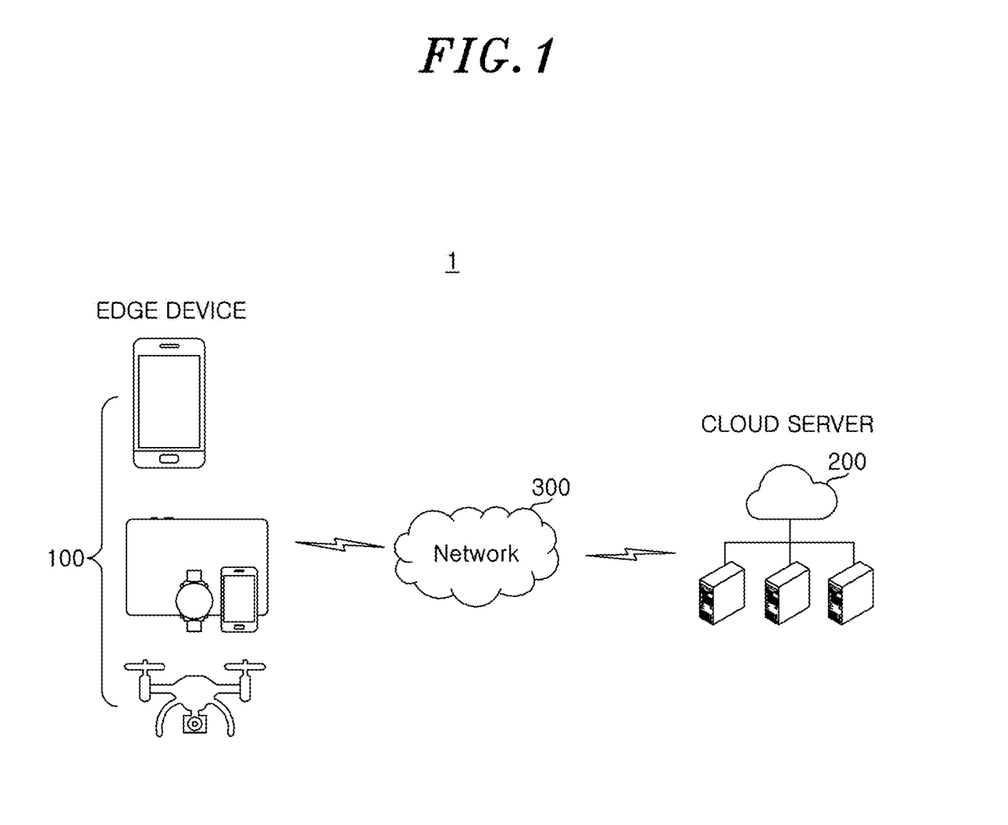
FIG. 1 is a block diagram showing a configuration of a deep neural network-based object detection system according to an embodiment of the present disclosure.
Figure 2:
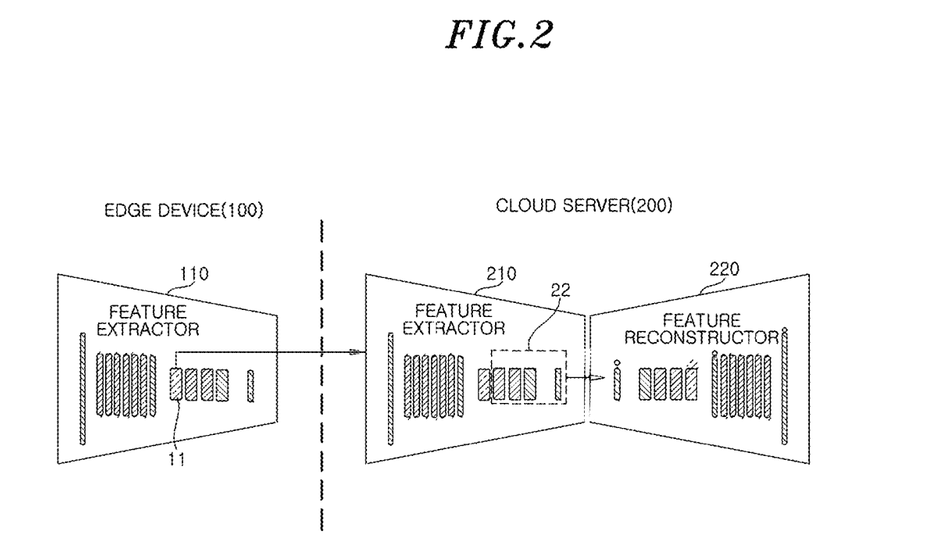
FIG. 2 is a conceptual diagram of an edge device and a cloud server according to an embodiment of the present disclosure.

FIG. 1 is a block diagram showing a configuration of a deep neural network-based object detection system according to an embodiment of the present disclosure, and FIG. 2 is a conceptual diagram for describing operations of an edge device and a cloud server according to an embodiment of the present disclosure.

Referring to FIG. 1, a deep neural network-based object detection system 1 according to an embodiment of the present disclosure includes at least one edge device 100 that executes edge computing and a cloud server 200 that receives data from the edge device 100, executes cloud computing, and transmits the execution result to the edge.

For example, the edge device 100 may correspond to a smart device, a drone, or a wearable device, but is not limited thereto.

The edge device 100 may include a camera that acquires images, a memory that stores information on a pre-trained extractor, and a processor that controls components of the edge device 100.

Basically, the edge device 100 can collect data, refine data, perform preprocessing such as sampling, cleaning, and combining data, and transmit preprocessing results to the cloud server 200.

The functions of the edge device 100 can be designed in various manners. For example, the functions may be designed such that the edge device 100 processes data without sending the data to the cloud server 200, but in the present disclosure, description will focus on an embodiment in which the edge device 100 and the cloud server 200 perform data processing in a split manner.

In an embodiment, the edge device 100 may input an image acquired through a camera to a pre-trained extractor 110 and extract a single feature through a plurality of layers included in the extractor 110.

Here, the extractor may be an artificial neural network that is trained by receiving training images and object information detected from the training images and is trained to output a single feature when an image is input at the time of inference. Here, the extractor may correspond to an encoder of an auto encoder.

In particular, the edge device 100 inputs the acquired image to the pre-trained extractor 110, and may extract a single feature related to the image as an output of a first layer corresponding to a predetermined split point among a plurality of layers included in the extractor 110 and transmit the single feature to the cloud server 200.

Here, in order to determine the location of a predetermined split point for the plurality of layers, the edge device 100 may analyze at least one of a network resource between the edge device 100 and the cloud server 200, a computing resource of the edge device 100, and a computing resource of the cloud server 200 and determine the location of the split point according to the analysis result. A layer corresponding to the split point may be referred to as a first layer.

The cloud server 200 may perform core processing, such as comprehensively performing tasks received from the edge device 100 or distributing some tasks to a specific edge device 100.

Results processed in the cloud server 200 may be delivered to the edge device 100.

In an embodiment, the cloud server 200 may detect an object of an image based on a single feature received from the edge device 100.

To this end, the cloud server 200 may include a pre-trained extractor 210, a memory that stores information of a pre-trained reconstructor 220, and a processor that controls components of the cloud server 200.

The cloud server 200 may obtain an output feature of the extractor 210 by inputting a single feature received from the edge device 100 to a second layer immediately after a first layer among a plurality of layers of the extractor 210. Subsequently, the processor 200 may obtain a plurality of predetermined intermediate features required for object detection from the reconstructor 220 by inputting the output feature of the extractor 210 to the reconstructor 220.

Here, the extractor 210 may be an artificial neural network pre-trained to output an output feature when receiving training images and object information detected from the training images.

The extractor 210 included in the cloud server 200 is the same as the extractor 110 included in the edge device 100.

The reconstructor 220 may be an artificial neural network pre-trained to output a reconstructed feature when receiving training images and object information detected from the training images. The reconstructor 220 may correspond to a decoder of an auto encoder.

Each layer constituting the reconstructor 220 is designed to have an inverse operation relationship with the layers of the extractor 210 to reconstruct predetermined intermediate layer features of the extractor 210.

In an embodiment, when the last layer of the extractor 110 is determined as a split point, the highest level feature is transmitted to the cloud server 200 and passed through the reconstructor 220. On the other hand, when splitting occurs in a previous layer of the extractor 110, the edge device 100 transmits a low-level feature that has progressed to the corresponding layer to the cloud server 200. The cloud server 200 inputs the received feature to the layer immediately after the split point of the extractor 210 to obtain a high-level output feature and passes the obtained output feature through the reconstructor 220.

The cloud server 200 uses multi-level intermediate features obtained by inputting the output features to the reconstructor 220 for object detection later. Therefore, according to the present disclosure, even if the edge device 100 transmits a single feature to the cloud server 200, intermediate features can be obtained and thus normal object detection can be performed.

Meanwhile, layers may output features of different sizes, and thus the cloud server 200 may determine the second layer to which a received single feature will be input from among the plurality of layers included in the extractor 210 using the received single feature.

Figure 3A:
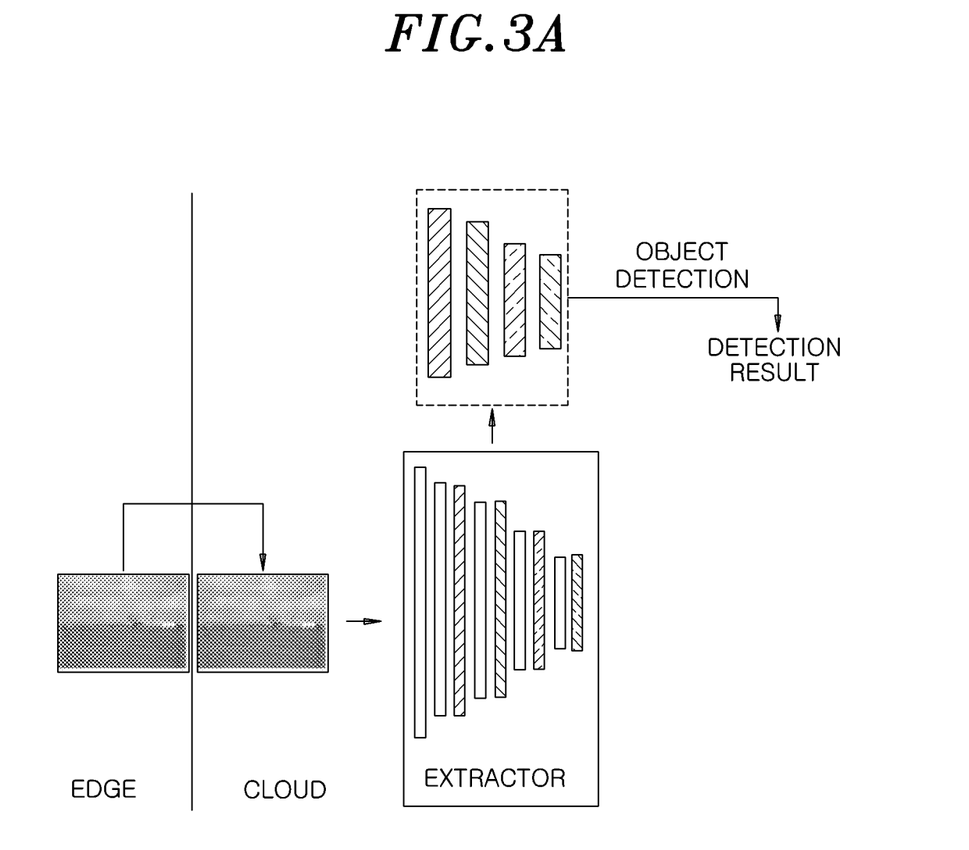
FIGS. 3A to 3C are diagrams for describing differences between prior arts and an embodiment of the present disclosure.
Figure 3B:
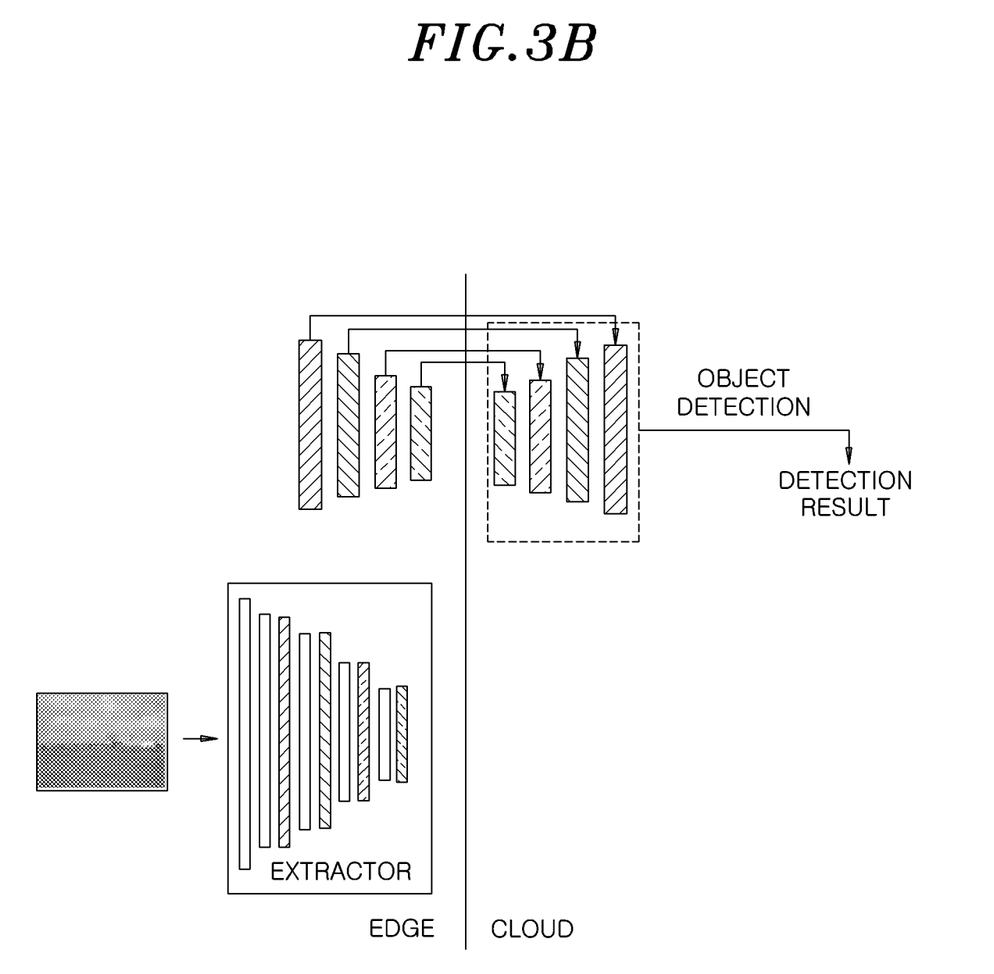
Figure 3C:
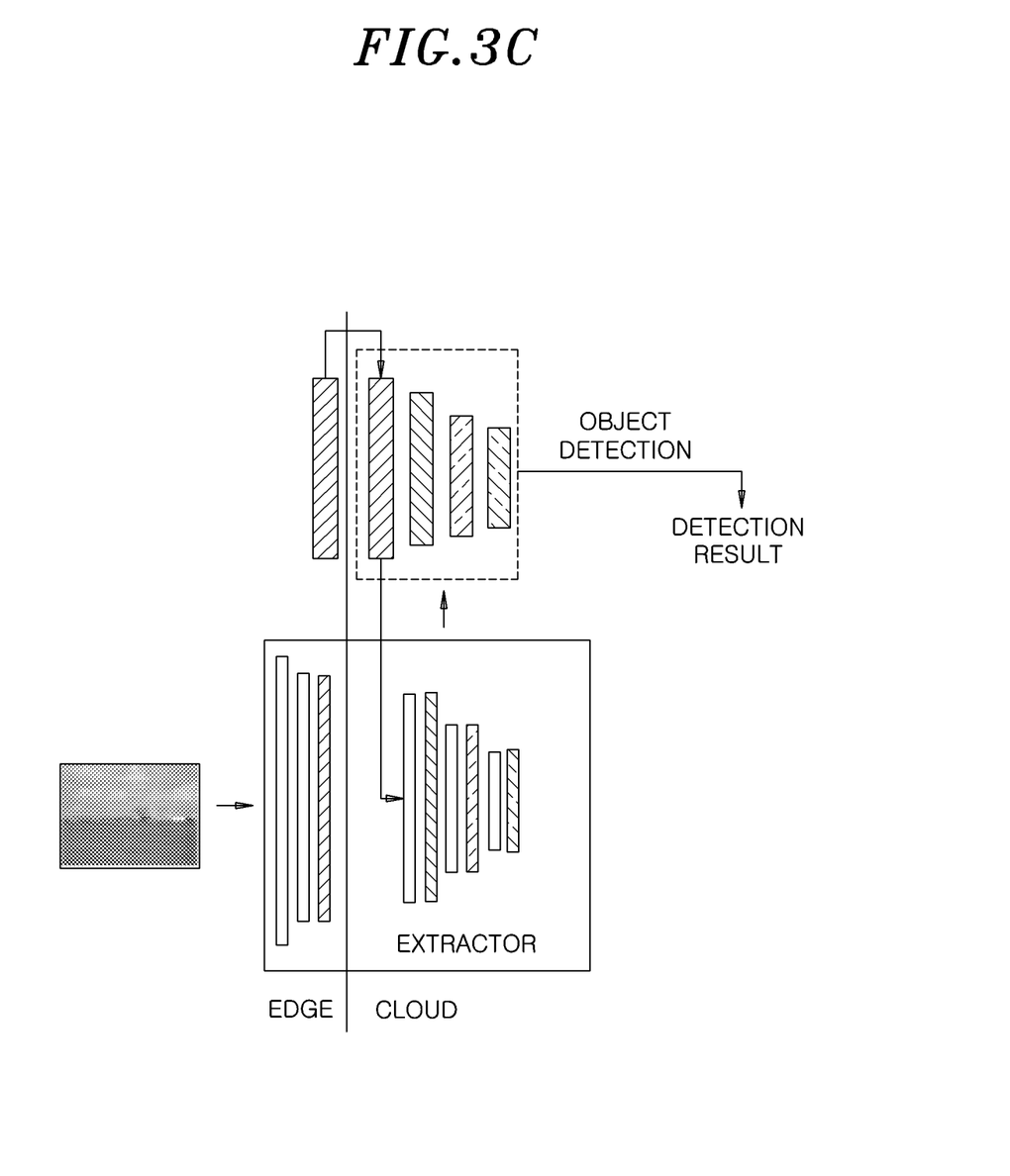

FIGS. 3A to 3C are diagrams for describing differences between prior arts and an embodiment of the present disclosure.

Referring to FIG. 3A, a prior art is a case in which an edge device does not include an extractor and a cloud server includes an extractor. In this case, the edge device transmits acquired image to the cloud server, and the cloud server inputs the image to the extractor and obtains a plurality of predetermined intermediate features to be used for object detection from the extractor. That is, the edge device only serves to acquire an image, and the cloud server detects an object in the image based on an artificial intelligence model. In this case, when the edge device transmits an image to the cloud server, there may be a problem in that it takes a long to transmit the image.

FIG. 3B describes a case in which only an edge device includes an extractor. When a plurality of predetermined intermediate features is extracted from the extractor of the edge device and the extracted intermediate features are transmitted to a cloud server, the cloud server detects an object in an image based on the plurality of intermediate features. In this case, the performance of the edge device is limited and the problem related to image transmission time cannot be solved.

FIG. 3C describes a case in which an edge device and a cloud server include the same extractor. When a single feature is extracted from an intermediate layer among a plurality of layers of the extractor of the edge device and transmitted to the cloud server, the extractor of the cloud server obtains a plurality of predetermined intermediate features by inputting the single feature to the layer immediately after the intermediate layer, and detects an object in an image based on the plurality of intermediate features. In this case, a delay time gain is limited because split layers are defined before the frontmost feature among a plurality of features is obtained.

Distinguished from these prior arts, in the deep neural network-based object detection system 1 according to an embodiment of the present disclosure shown in FIG. 2, the edge device 100 includes the extractor 110, and the cloud server 200 includes the extractor 210 and the reconstructor 220.

In summary, the edge device 100 analyzes a network speed between the edge device 100 and the processor 200 and at least one of the performances of the edge device 100 and the processor 200, determines the location of a split point according to the analysis result, and transmits a single feature output from the first layer 11 corresponding to the split point to the cloud server 200. The cloud server 200 may obtain a high-level feature by inputting the single feature to a layer 22 of the extractor 210 immediately after the first layer 11 from which the single feature transmitted from the edge device 100 is output. Subsequently, the cloud server 200 may input the obtained feature to the reconstructor 220 to obtain a plurality of predetermined intermediate features required for object detection from the reconstructor 220. Here, each layer constituting the reconstructor 220 has an inverse operation relationship with the layers of the extractor 210 to reconstruct intermediate features corresponding to a predetermined intermediate layer of the extractor 210.

Figure 4:
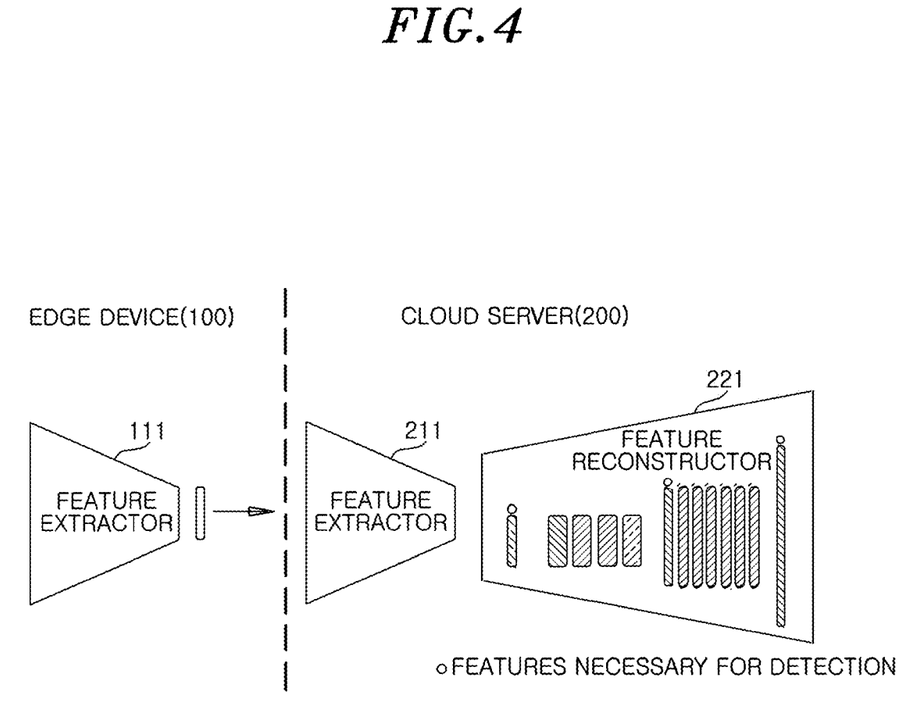
FIG. 4 is a conceptual diagram for describing a deep neural network-based object detection system according to another embodiment of the present disclosure.

FIG. 4 is a conceptual diagram for describing a deep neural network-based object detection system according to another embodiment of the present disclosure.

The deep neural network-based object detection system 1 described with reference to FIGS. 1 and 2 can reduce the amount of transmission the edge device 100 through the reconstructor 220 of the cloud server 200, but a problem with respect to transmission time in a wireless network situation cannot be solved. Further, in the edge device 100 having limited resources, a significant delay time may be taken to execute the extractor 110.

In order to solve these problems, in the deep neural network-based object detection system 11 according to another embodiment of the present disclosure shown in FIG. 4, the number of channels included in each layer of extractors 111 and 211 may be less than the number of channels included in each layer of the extractor 210 shown in FIG. 2.

However, if only the number of channels of the extractors 111 and 211 is reduced, object detection accuracy is reduced. To compensate for this, asymmetric scaling in which the scale of the reconstructor 221 is increased is applied.

An embodiment may be an asymmetric structure in which the number of channels of at least one of a plurality of layers included in the extractors 111 and 211 is less than the number of channels of at least one layer corresponding to at least one of a plurality of layers included in a reconstructor 221.

Further, an embodiment may be an asymmetric structure in which the number of layers included in the extractors 111 and 211 may be different from the number of layers included in the reconstructor 221. In this case, the number of layers included in the extractors 111 and 211 may be less than the number of layers included in the reconstructor 221.

This is because the extractor 111 is executed in the edge device 100 with lower performance, whereas the reconstructor 221 is executed in the cloud server 200 with better performance.

That is, since the extractor 111 is executed in the edge device 100, the execution time is long (that is, delay time is long). Accordingly, the number of layers included in the extractor 111 is less than the number of layers included in the reconstructor 221, and thus the delay time can be reduced. In addition, the number of channels of at least one of the plurality of layers included in the extractor 111 is less than the number of channels of at least one layer corresponding to at least one of the plurality of layers included in the reconstructor 221, and thus the delay time can be reduced and the amount of data transmitted from the edge device 100 to the cloud server 200 can be decreased.

Meanwhile, if the number of layers included in the extractors 111 and 211 and/or the number of channels included in at least one of the plurality of layers included in the extractors 111 and 211 are reduced, the performance may deteriorate (i.e. object detection accuracy decreases).

Accordingly, as shown in FIG. 4, performance deterioration can be prevented by increasing the number of layers included in the reconstructor 221 and/or the number of channels included in at least one of the plurality of layers included in the reconstructor 221.

Figure 5:
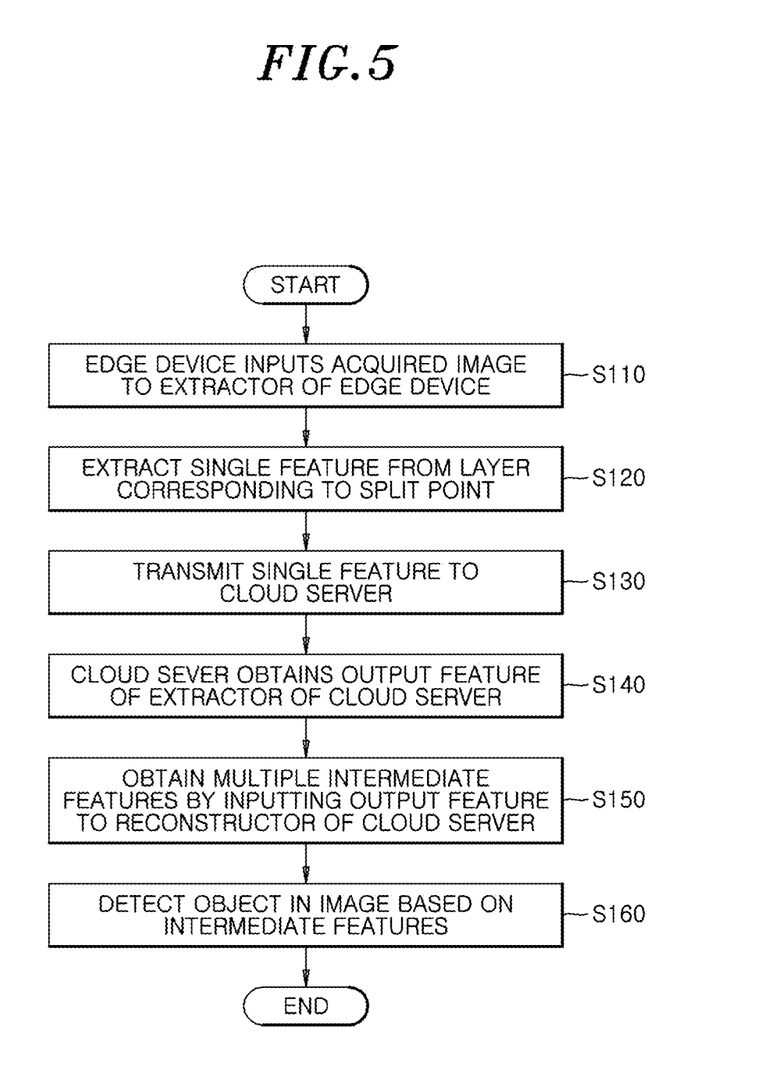
FIG. 5 is a flowchart illustrating a deep neural network-based object detection method according to an embodiment of the present disclosure.

FIG. 5 is a flowchart illustrating a deep neural network-based object detection method according to an embodiment of the present disclosure.

The deep neural network-based object detection method according to the present embodiment may be performed in substantially the same configuration as the system 1 of FIG. 1. Accordingly, components identical to those of the system 1 of FIG. 1 are denoted by the same reference numerals, and redundant descriptions are omitted.

Referring to FIG. 5, in the deep neural network-based object detection method according to an embodiment of the present disclosure, an edge device inputs an acquired image to a pre-trained extractor (S110).

Next, the edge device extracts a single feature of the image as an output of a first layer corresponding to a predetermined split point among a plurality of layers included in the extractor (S120).

Next, the edge device transmits the extracted single feature to the cloud server (S130).

Next, the cloud server including the same extractor as that of the edge device and a reconstructor obtains an output feature of the extractor by inputting the single feature to a second layer immediately after the first layer (S140).

Next, the cloud server obtains a plurality of intermediate features to be used to detect an object in the image by inputting the output features to the reconstructor (S150).

Next, the cloud server may detect the object in the image based on the plurality of intermediate features (S160).

The deep neural network-based object detection system described above may be implemented by a computing device including at least some of a processor, a memory, a user input device, and a presentation device. The memory is a medium that stores computer-readable software coded such that a specific task can be performed when executed by the processor, applications, program modules, routines, instructions, and/or data. The processor may read and execute the computer-readable software, applications, program modules, routines, instructions, and/or data stored in the memory.

The computing device may include a variety of devices such as smartphones, tablets, laptops, desktops, servers, and clients. The computing device may be a single stand-alone device or may include multiple computing devices operating in a distributed environment and cooperating with each other over a communications network.

In addition, the above-described deep neural network-based object detection method may be executed by a computing device including a processor and a memory that stores computer-readable software coded to perform an object detection method using an artificial intelligence model when executed by the processor, applications, program modules, routines, instructions, and/or data structures.

The present embodiments described above may be implemented through various means. For example, the present embodiments may be implemented by hardware, firmware, software, or a combination thereof.

In the case of implementation by hardware, an image diagnosis method using an artificial intelligence model according to the present embodiments may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

For example, an object detection method according to embodiments may be implemented using an artificial intelligence semiconductor device in which neurons and synapses of a deep neural network are implemented as semiconductor devices. In this case, the semiconductor devices may be currently used semiconductor devices such as SRAMs, DRAMs, and NANDs, next-generation semiconductor devices, RRAMs, STT MRAMs, PRAMs, or a combination thereof.

When the object detection method according to the embodiments is implemented using an artificial intelligence semiconductor device, results (weights) of learning an auto-encoder as software may be transferred to synaptic mimic devices arranged in an array, or learning may be performed in the artificial intelligence semiconductor device.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A cloud server for detecting an object of an image based on a single feature received from an edge device, comprising:
    a memory configured to store information on a pre-trained extractor of the cloud server having a first layer and a second layer and a pre-trained reconstructor of the cloud server; and
    a processor,
    wherein the processor is configured to:
    receive a single feature of an image from the edge device, wherein the edge device includes an extractor having a plurality of layers and the single feature of the image is extracted by a first layer of the extractor of the edge device corresponding to a predetermined split point among the plurality of layers of the extractor of the edge device; and
    obtain an output feature of the extractor of the cloud server by inputting the single feature received from the first layer included in the extractor of the edge device to the second layer included in the extractor of the cloud server, and
    detect an object in the image by inputting the output feature obtained from the extractor of the cloud server to the reconstructor of the cloud server, wherein a number of channels of at least one of the plurality of layers included in the extractor of the edge device or the extractor of the cloud server is less than a number of channels corresponding to at least one of a plurality of layers included in the reconstructor of the cloud server.

2. The cloud server of claim 1, wherein the extractor of the edge device or the extractor of the cloud sever server is an artificial neural network trained by receiving training images and object information detected from the training images, and
    wherein the extractor of the edge device or the extractor of the cloud sever server is trained to output a single feature corresponding to each of the training images.

3. The cloud server of claim 2, wherein the reconstructor of the cloud server is an artificial neural network trained by receiving training images and object information detected from the training images, and
    wherein the reconstructor of the cloud server is trained to output a plurality of features corresponding to the single feature output from the extractor of the edge device or the extractor of the cloud server.

4. The cloud server of claim 1, wherein each layer of the reconstructor of the cloud server has an inverse operation relationship with each layer of the extractor of the edge device or the extractor of the cloud server to reconstruct predetermined intermediate layer features of the extractor of the edge device or the extractor of the cloud sever server.

5. The cloud server of claim 1, wherein a number of the plurality of layers included in the extractor of the edge device or the extractor of the cloud server is less than a number of the plurality of layers included in the reconstructor of the cloud server.

6. An edge device for transmitting a single feature obtained from an image to a cloud server, comprising:
    a memory configured to store information on a pre-trained extractor of the edge device having a plurality of layers; and
    a processor,
    wherein the processor is configured to:
    input the image to the pre-trained extractor of the edge device,
    extract the single feature of the image from a first layer corresponding to a predetermined split point among the plurality of layers included in the extractor of the edge device, and
    transmit the extracted single feature to the cloud server,
    wherein the cloud server includes a memory configured to store information on an extractor of the cloud server including same structure as the extractor of the edge device and a reconstructor of the cloud server, and a processor,
        wherein the processor of the cloud server is configured to:
    receive the single feature from the edge device,
    input the single feature received from the extractor of the edge device to a portion of the extractor of the cloud server,
    obtain an output feature output from the extractor of the cloud server,
    input the output feature to the reconstructor of the cloud server, and
    obtain a plurality of intermediate features used to detect an object in the image output from the reconstructor of the cloud server,
    wherein the extractor of the cloud server and the reconstructor of the cloud server includes a plurality of layers, and
    wherein a number of the plurality of layers included in the extractor of the edge device or the extractor of the cloud server is less than a number of the plurality of layers included in the reconstructor of the cloud server.

7. The edge device of claim 6, wherein the processor of the edge device is configured to analyze at least one of a network resource between the edge device and the cloud server, a computing resource of the edge device, and a computing resource of the cloud server, and determine a location of the split point with respect to the first layer based on an analysis result.

8. The edge device of claim 6, wherein the extractor of the cloud server and the reconstructor of the cloud server includes a plurality of layers, and
    wherein each layer of the reconstructor of the cloud server has an inverse operation relationship with each layer of the extractor of the edge device or the extractor of the cloud server to reconstruct predetermined intermediate layer features of the extractor of the cloud server.

9. The edge device of claim 6, wherein the extractor of the cloud server and the reconstructor of the cloud server includes a plurality of layers, and
    wherein a number of channels of at least one of the plurality of layers included in the extractor of the edge device or the extractor of the cloud server is less than a number of channels corresponding to at least one of a plurality of layers included in the reconstructor of the cloud server.

10. A deep neural network-based object detection method comprising:
    inputting, by a processor included in an edge device, an acquired image to a pre-trained extractor of the edge device;

extracting, by the processor included in the edge device, a single feature corresponding to the image from a first layer of the extractor of the edge device corresponding to a predetermined split point among a plurality of layers included in the extractor of the edge device;

transmitting, by the processor included in the edge device, the extracted single feature to a cloud server;

receiving, by a processor included in the cloud server, the single feature from the edge device, wherein the cloud server includes an extractor of the cloud server having a first layer and a second layer and a reconstructor;

obtaining, by the processor included in the cloud server, an output feature of the extractor of the cloud server by inputting the single feature to the second layer included in the extractor of the cloud server; and obtaining, by the processor included in the cloud server, a plurality of intermediate features used to detect an object in the image by inputting the output feature to the reconstructor of the cloud server, wherein a number of the plurality of layers included in the extractor of the edge device or the extractor of the cloud server is less than a number of the plurality of layers included in the reconstructor of the cloud server.

11. The deep neural network-based object detection method of claim 9, further comprising:

analyzing, by the processor included in the edge device, at least one of a network resource between the edge device and the cloud server, a computing resource of the edge device, and a computing resource of the cloud server; and determining a location of the split point with respect to the first layer included in the extractor of the edge device based on an analysis result.

12. The deep neural network-based object detection method of claim 10, wherein the extractor of the edge device or the extractor of the cloud server is an artificial neural network trained by receiving training images and object information detected from the training images, and wherein the extractor of the edge device or the extractor of the cloud server is trained to output a single feature corresponding to each of the training images.

13. The deep neural network-based object detection method of claim 10, wherein the reconstructor of the cloud server is an artificial neural network trained by receiving training images and object information detected from the training images, and wherein the reconstructor of the cloud server is trained to output a plurality of features corresponding to the single feature output from the extractor of the edge device or the extractor of the cloud server.

14. The deep neural network-based object detection method of claim 10, wherein each layer of the reconstructor of the cloud server has an inverse operation relationship with each layer of the extractor of the edge device or the extractor of the cloud server to reconstruct predetermined intermediate layer features of the extractor of the edge device or the extractor of the cloud server.

15. The deep neural network-based object detection method of claim 10, wherein a number of channels of at least one of the plurality of layers included in the extractor of the edge device or the extractor of the cloud server is less than a number of channels corresponding to at least one of a plurality of layers included in the reconstructor of the cloud server.

\* \* \* \* \*